US011910152B2

(12) United States Patent
Hung et al.

(10) Patent No.: US 11,910,152 B2
(45) Date of Patent: Feb. 20, 2024

(54) EARPHONE

(71) Applicant: Chiun Mai Communication Systems, Inc., New Taipei (TW)

(72) Inventors: Ching-Ming Hung, New Taipei (TW); Sheng-Hsiung Tsai, New Taipei (TW); Pei-Shuang Huang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 206 days.

(21) Appl. No.: 17/533,322

(22) Filed: Nov. 23, 2021

(65) Prior Publication Data

US 2022/0167078 A1 May 26, 2022

(30) Foreign Application Priority Data

Nov. 25, 2020 (CN) ......................... 202011340860.1

(51) Int. Cl.
*H04R 25/00* (2006.01)
*H04R 1/10* (2006.01)

(52) U.S. Cl.
CPC ......... *H04R 1/1083* (2013.01); *H04R 1/1016* (2013.01); *H04R 1/1041* (2013.01)

(58) Field of Classification Search
CPC ... H04R 1/1083; H04R 1/1016; H04R 1/1041
See application file for complete search history.

(56) References Cited

U.S. PATENT DOCUMENTS 11,159,876 B2 * 10/2021 Keady .................. H04R 1/1091
2012/0103346 A1 * 5/2012 Keady ..................... A61F 11/08 128/865
2012/0305329 A1 * 12/2012 Keady ..................... A61F 11/08 181/135
2013/0101147 A1 * 4/2013 Kraemer ................ H04R 25/65 381/322
2013/0136285 A1 * 5/2013 Naumann ............ H04R 25/656 381/329
2013/0251172 A1 * 9/2013 Mosseri ............... H04R 1/1083 381/74
2016/0050483 A1 * 2/2016 Kulavik ............... H04R 1/1016 381/380
2016/0112814 A1 * 4/2016 Hug ....................... H04R 25/70 381/60
2017/0303031 A1 * 10/2017 Barry ....................... H04R 1/24
2018/0054668 A1 * 2/2018 Keady .................. H04R 1/1091
2019/0387305 A1 * 12/2019 Keady .................. H04R 1/1091
2021/0385569 A1 * 12/2021 Keady .................. H04R 1/1058

FOREIGN PATENT DOCUMENTS

CN 208971742 U 6/2019

* cited by examiner

*Primary Examiner* — Simon King
(74) *Attorney, Agent, or Firm* — ScienBiziP, P.C.

(57) ABSTRACT

An earphone of adjustable size to fit the ears of different users includes a housing, a speaker, an air path, an inflatable earplug, and a control assembly. The speaker and at least one part of the air path are arranged in the housing. The inflatable earplug communicates with the air path and is detachably attached to the housing. The control assembly is arranged outside of the housing and configured to inflate and deflate the inflatable earplug through the air path.

17 Claims, 8 Drawing Sheets

EARPHONE

CROSS-REFERENCE TO RELATED APPLICATIONS

This application claims priority to Chinese Patent Application No. 202011340860.1 filed on Nov. 25, 2020 in China National Intellectual Property Administration, the contents of which are incorporated by reference herein.

FIELD

The subject matter herein generally relates to acoustic technology field, and particularly to an earphone.

BACKGROUND

Earphones are not suitable for every consumer. Earplugs of different sizes can be provided to the user together with the earphones for improving a user experience. However, providing extra earplugs increases cost and requires more materials which is not beneficial to the the environment. Therefore, there is room for improvement within the art.

BRIEF DESCRIPTION OF THE DRAWINGS

Implementations of the present disclosure will now be described, by way of example only, with reference to the attached figures.

DETAILED DESCRIPTION

Figure 1:
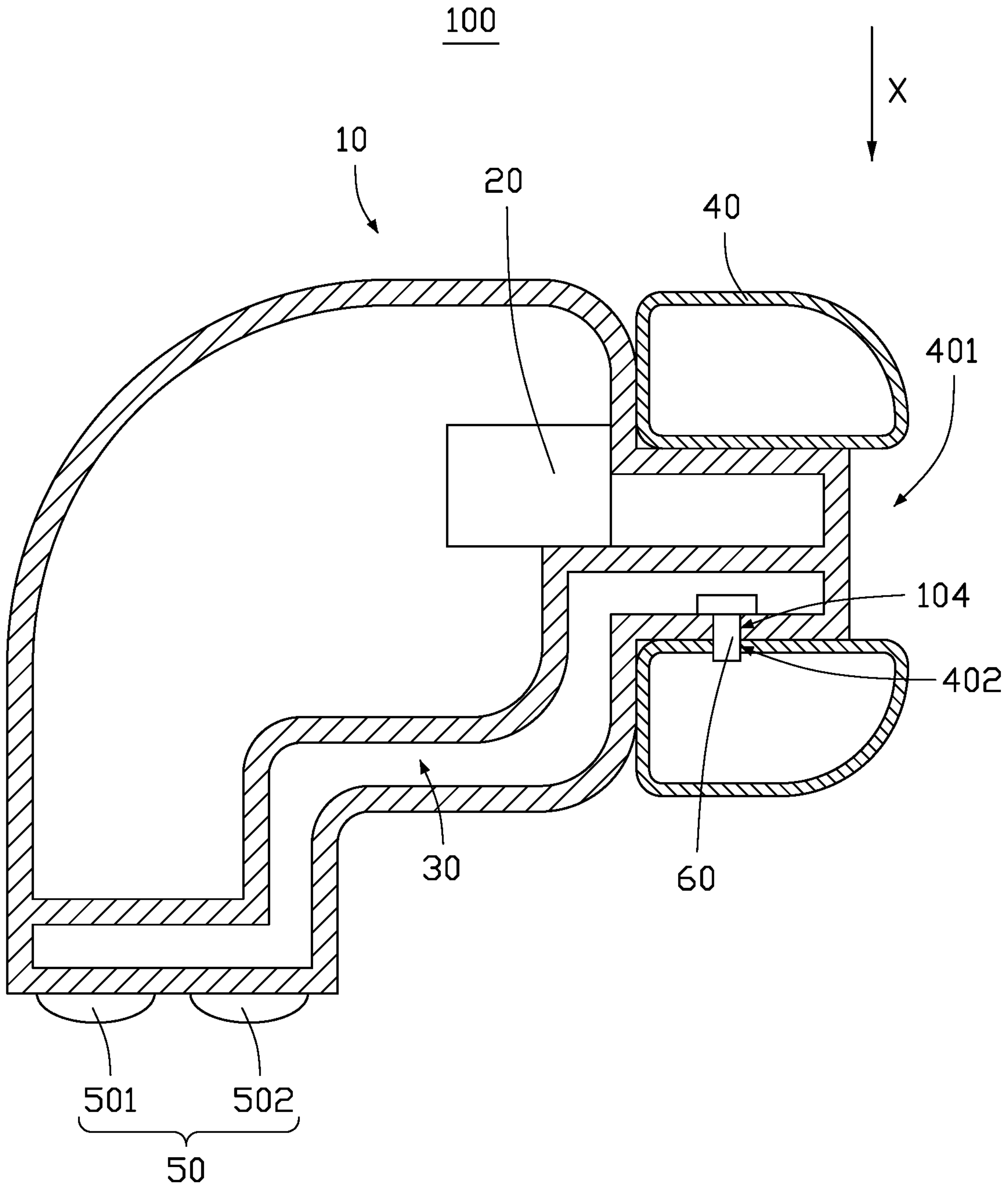
FIG. 1 is a schematic diagram of at least one embodiment of an earphone according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but may have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an earphone and a wireless communication device using the same.

FIG. 1 illustrates at least one embodiment of an earphone (earphone 100). A wireless communication device 200, which may be for example, a mobile phone, a tablet computer, a laptop, a personal digital assistant (PDA), a smart watch, a game machine, or a television, makes use of the earphone 100. The earphone 100 outputs audio signals.

The earphone 100 includes a housing 10, a speaker 20, an air path 30, an inflatable earplug 40, and a control assembly 50. The speaker 20 is arranged in the housing 10. At least one part of the air path 30 is arranged in the housing 10. The inflatable earplug 40 is in communication with the air path 30 and detachably arranged on the housing 10. The control assembly 50 is arranged on the housing 10 and configured to inflate the inflatable earplug 40 with air and deflate or allow release of air from the inflatable earplug 40 through the air path 30.

In at least one embodiment, a part of the internal space of the housing 10 serves as the air path 30, and the air path 30 communicates with the inflatable earplug 40, the control assembly 50 inflates the inflatable earplug 40 with air and allows release of air from (or deflate) the inflatable earplug 40, thus a size of the inflatable earplug 40 is adjustable for different user's ears, so as to improve a user experience. Additionally, the inflatable earplug 40 is detachably arranged on the housing 10 and convenient for being changed. Thereby, no extra earplugs are needed for the earphone 100.

Figure 2:
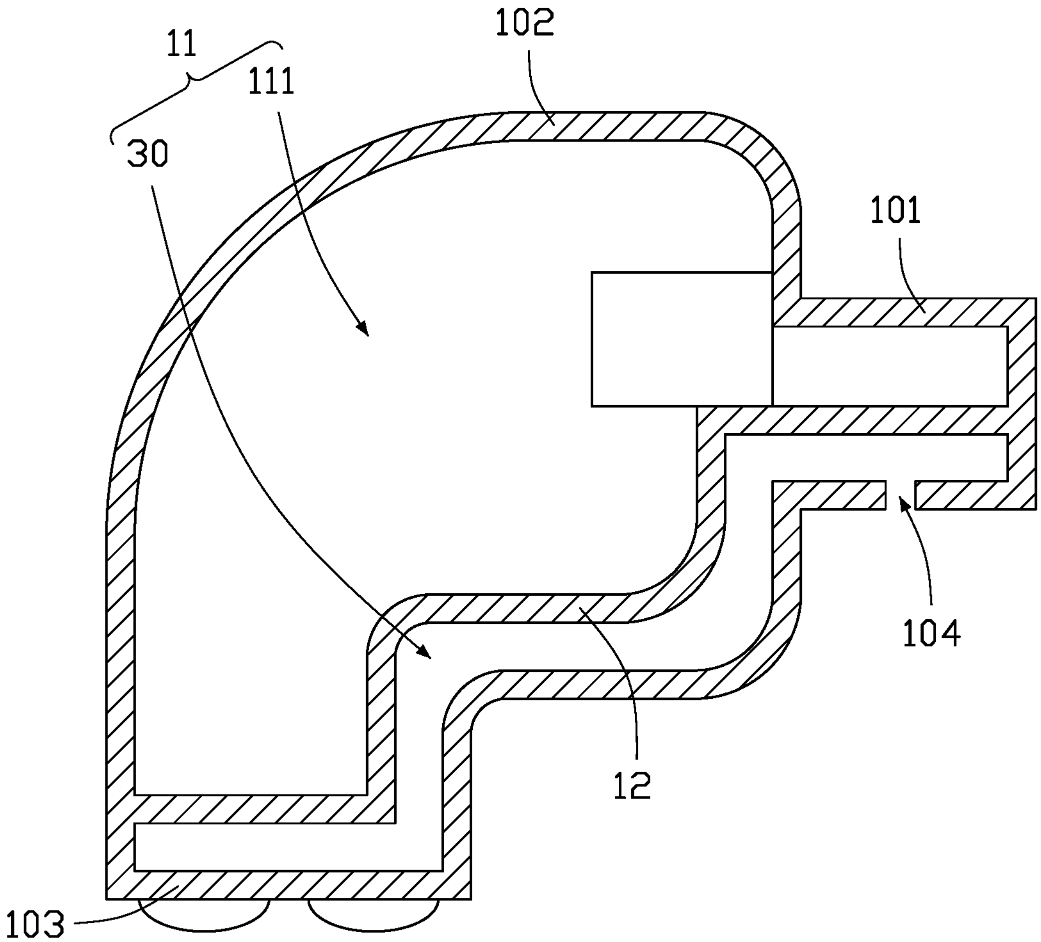
FIG. 2 is a schematic diagram of at least one embodiment of part of the earphone of FIG. 1.

Referring to FIGS. 1 and 2, the housing 10 defines a receiving chamber 11. The chamber 11 includes a dividing portion 12. The dividing portion 12 divides the receiving chamber 11 into a sound path 111 and the air path 30. The speaker 20 is arranged in the sound path 111.

The housing 10 includes a front end portion 101 and a rear end portion 102 away from the front end portion 101. The sound path 111 and the air path 30 extend from the rear end portion 102 to the front end portion 101. The inflatable earplug 40 is arranged to the front end portion 101.

In at least one embodiment, the inflatable earplug 40 is hollow and ring shaped and defines an opening 401 in a middle part. Thus, the inflatable earplug 40 may be arranged on the front end portion 101 through the opening 401. That is, the front end portion 101 is inserted into the opening 401. A part of the air path 30 and a part of the sound path 111 are positioned in the opening 401.

In other embodiments, the inflatable earplug 40 defines the opening 401 at or close to an edge and not in the middle part.

Referring to FIG. 1, the earphone 100 further includes an engaging piece 60. The engaging piece 60 is connected to a connection of the inflatable earplug 40 and the air path 30 and configured to engaged with the control assembly 50 for inflating air to the inflatable earplug 40 and releasing air from the inflatable earplug 40. Additionally, the engaging piece 60 is further configured to ensure a gas tightness of the inflatable earplug 40 for preventing any gas leaking.

Referring to FIGS. 1 and 2, the housing 10 defines a first hole 104 communicating with the air path 30. The inflatable earplug 40 defines a second hole 402 engaging with the first hole 104. The engaging piece 60 is arranging in the first hole 104 and the second hole 402.

Referring to FIGS. 1 and 2, the control assembly 50 includes a pumping element 501. The pumping element 501 is arranged on the rear end portion 102 and connected to the air path 30. The pumping element 501 and the engaging piece 60 cooperatively inflate the inflatable earplug 40 with air through the air path 30, so adjusting a size of the inflatable earplug 40 for fixing different user's ears.

The control assembly 50 further includes a releasing valve 502. The releasing valve 502 is arranged on the rear end portion 102 and connected to the air path 30. The releasing valve 502 and the engaging piece 60 cooperatively release air from (or deflate) the inflatable earplug 40 through the air path 30, so as to adjust a size of the inflatable earplug 40 for fixing different user's ears.

Several embodiments of the earphone 100 are described as follows:

First Embodiment

Referring to FIG. 1, an earphone 100 includes a housing 10, a speaker 20, an air path 30, an inflatable earplug 40, a control assembly 50, and an engaging piece 60.

Referring to FIG. 2, the housing 10 defines a receiving chamber 11. The chamber 11 includes a dividing portion 12. The dividing portion 12 divides the receiving chamber 11 into a sound path 111 and the air path 30. In the first embodiment, the housing 10 is substantially L-shaped. In a length direction (that is, an X-axis direction) of the earphone 100, the sound path 111 is above the air path 30.

A material of the air path 30 may be same as or different from a material of the housing 10. The material of the housing 10 may be metal, silicon, or plastic.

Referring to FIGS. 1 and 2, the housing 10 includes a front end portion 101, a rear end portion 102, and a connecting portion 103. The rear end portion 102 is away from the front end portion 101. The connecting portion 103 is connected between the front end portion 101 and the rear end portion 102. The sound path 111 and the air path 30 extend from the rear end portion 102 to the front end portion 101.

Referring to FIGS. 1 and 2, the inflatable earplug 40 is hollow and ring shaped. In the first embodiment, the inflatable earplug 40 defines an opening 401 in a middle part. Thus, the inflatable earplug 40 may be arranged on the front end portion 101 through the opening 401. That is, the front end portion 101 is inserted into the opening 401. A part of the air path 30 and a part of the sound path 111 are positioned in the opening 401.

The inflatable earplug 40 may be made of silicon or high elasticity polyester. The inflatable earplug 40 and the front end portion 101 are in an interference fit.

Referring to FIGS. 1 and 2, the speaker 20 is received in the sound path 111 close to the front end portion 101. The front end portion 101 defines a plurality of sound holes (not shown) communicating with the sound path 111 and the opening 401. Thus, sound generated by the speaker 20 is outputted through the sound holes.

Referring to FIGS. 1 and 2, the engaging piece 60 is connected to a connection of the inflatable earplug 40 and the air path 30 and configured to engage with the control assembly 50 for inflating air to the inflatable earplug 40 and releasing air from the inflatable earplug 40.

Additionally, the engaging piece 60 is further configured to ensure a gas tightness of the inflatable earplug 40 for preventing any gas leaking. In the first embodiment, the engaging piece 60 further includes a valve. The valve may be a duckbill valve. In other embodiments, the valve may be selected from at least one of vane check valve, large-diameter nozzle, and tine nozzle.

Referring to FIGS. 1 and 2, the front end portion 101 defines a first hole 104 communicating with the air path 30. The inflatable earplug 40 defines a second hole 402 engaging with the first hole 104. The engaging piece 60 is arranging in the first hole 104 and the second hole 402.

Referring to FIGS. 1 and 2, the control assembly 50 includes a pumping element 501 and a releasing valve 502. The pumping element 501 is arranged on the rear end portion 102 and connected to the air path 30. The pumping element 501 and the engaging piece 60 cooperatively inflate the inflatable earplug 40 with air through the air path 30, so as to adjust a size of the inflatable earplug 40 for fixing different user's ears. The releasing valve 502 is arranged on the rear end portion 102 and connected to the air path 30. The releasing valve 502 and the engaging piece 60 cooperatively allow release of air from (or deflate) the inflatable earplug 40 through the air path 30, so as to further adjust a size of the inflatable earplug 40 for fixing different user's ears.

Second Embodiment

Figure 3:
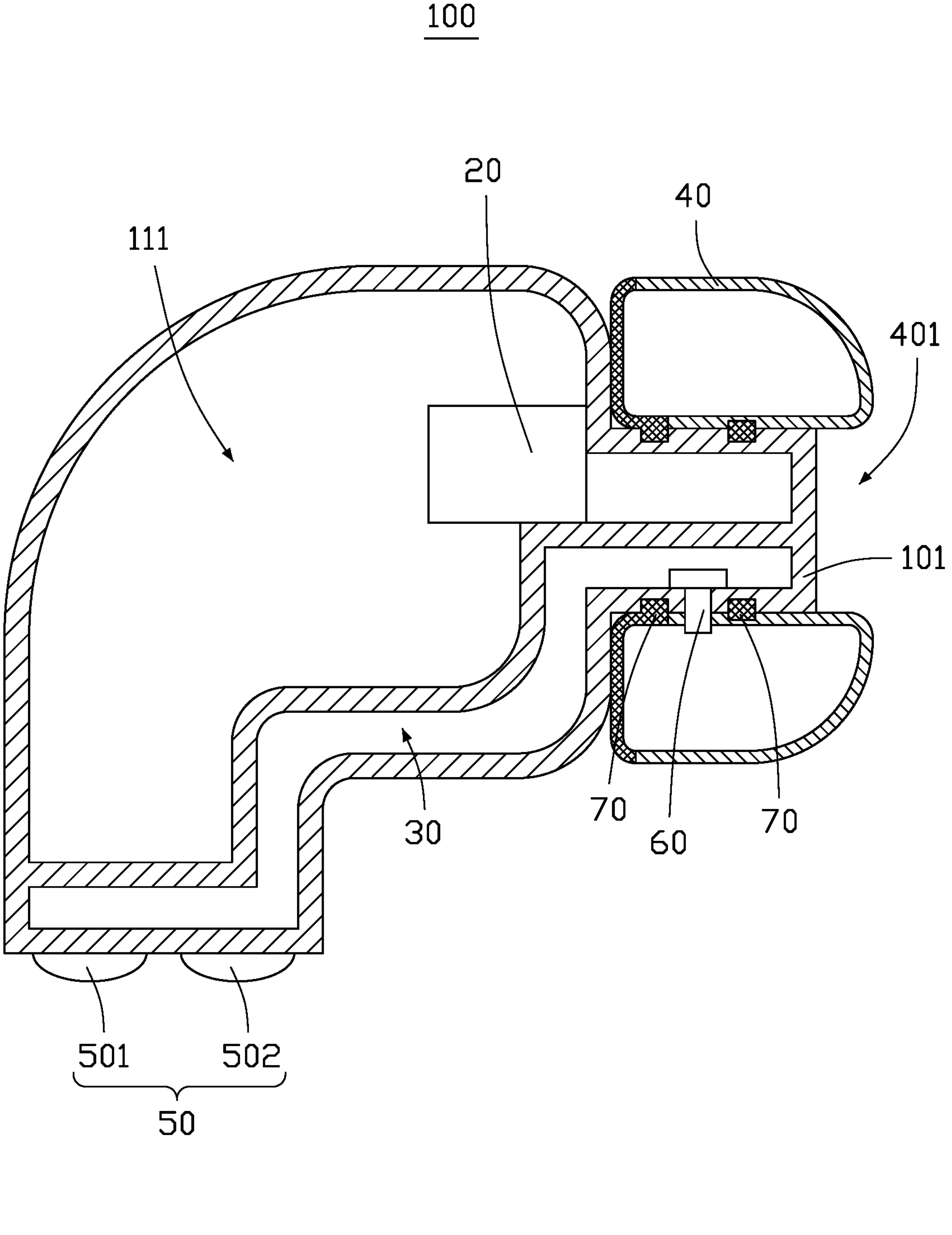
FIG. 3 is a schematic diagram of a second embodiment of an earphone according to the present disclosure.

Referring to FIG. 3, differences between the second embodiment and the first embodiment includes the earphone 100 further including two seal pieces 70.

In the second embodiment, referring to FIG. 3, the two seal pieces 70 are arranged in the opening 401. The inflatable earplug 40 may be arranged on the front end portion 101, the two seal pieces 70 are arranged on opposite sides of the engaging piece 60 for improving a gas tightness of the inflatable earplug 40. Meanwhile, the two seal pieces 70 strengthen the connection of the inflatable earplug 40 and the housing 10.

Figure 4:
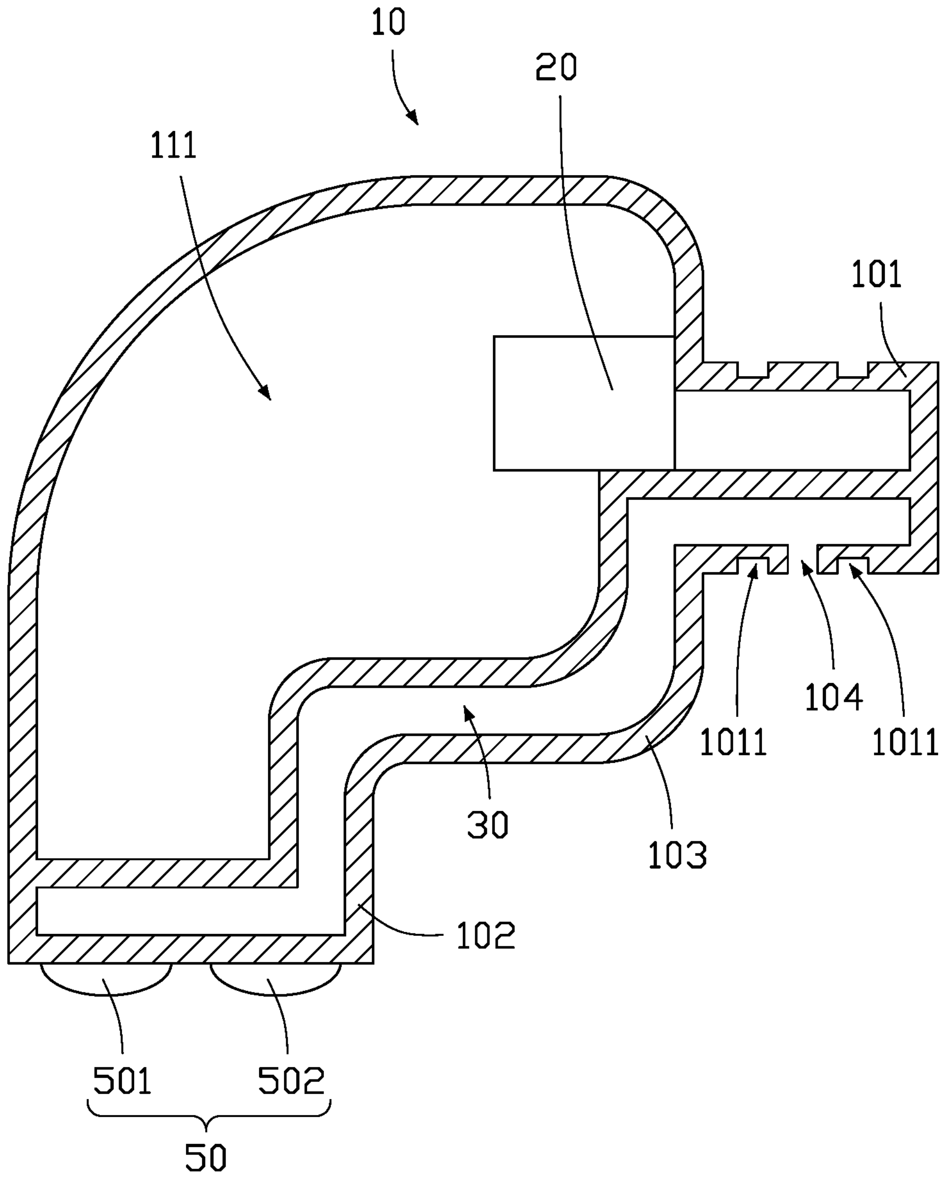
FIG. 4 is a schematic diagram of part of the earphone of FIG. 3.

Referring to FIGS. 3 and 4, the front end portion 101 defines two slots 1011 engaging with the two seal pieces 70. The two slots 1011 are arranged on opposite sides of the engaging piece 60. Thus, the front end portion 101 is inserted into the inflatable earplug 40, the two seal pieces 70 are latched into the two slots 1011, so as to strengthen the connection of the inflatable earplug 40 and the housing 10. In other embodiments, the front end portion 101 defines at least one slot 1011 engaging with the seal piece 70. The at least one slot 1011 may be arranged on at least one side of the engaging piece 60, the seal piece 70 is latched into the at least one slot 1011. In other embodiments, the two slots 1011 may be omitted.

In other embodiments, the earphone 100 includes the seal piece 70 arranged between the inflatable earplug 40 and the housing 10 and adjacent to a side of the engaging piece 60. Correspondingly, the front end portion 101 defines the slot 1011 for engaging the seal piece 70.

In the second embodiment, the seal piece 70 may be a seal ring. The two seal pieces 70 and the inflatable earplug 40 may be integrally formed.

Third Embodiment

Figure 5:
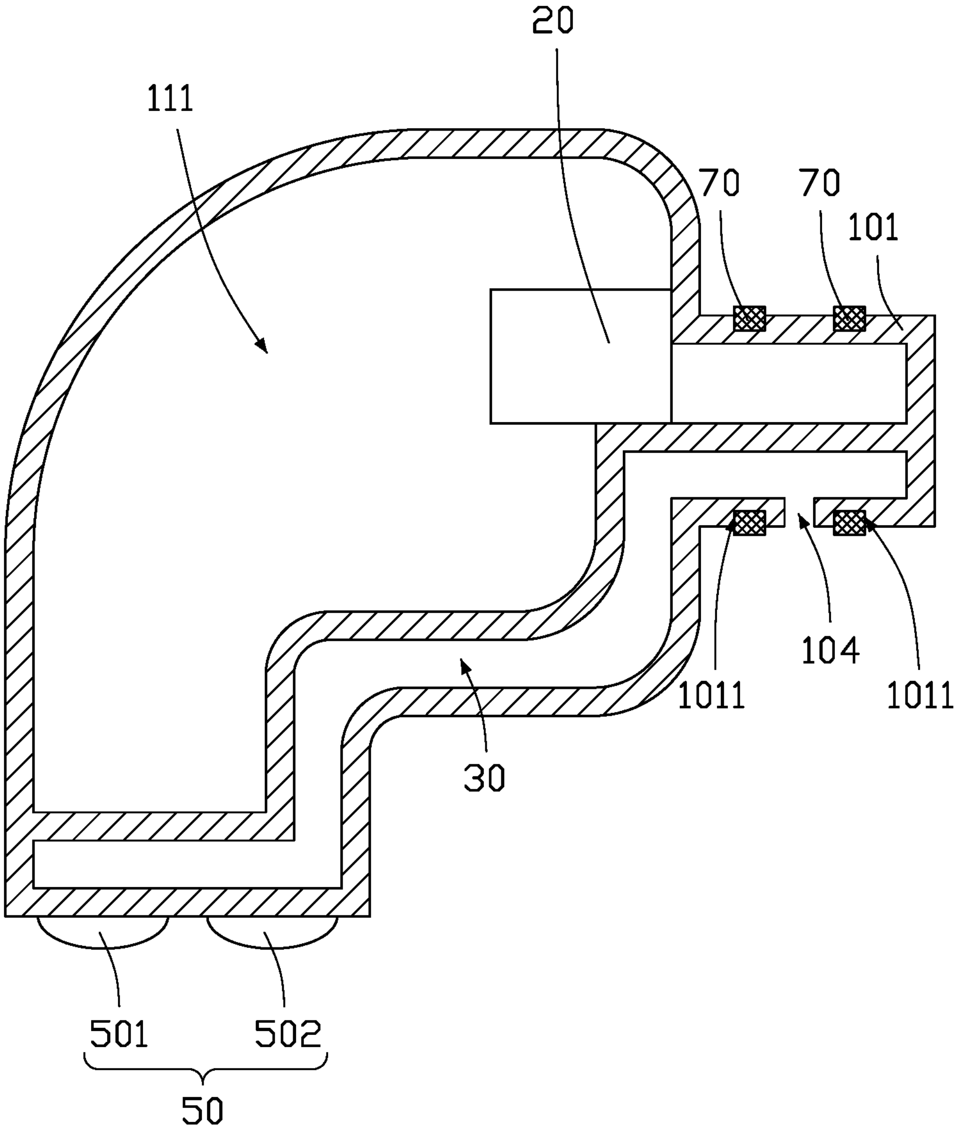
FIG. 5 is a schematic diagram of part of a third embodiment of the earphone according to the present disclosure.

Referring to FIG. 5, differences between the third embodiment and the second embodiment may include the two seal pieces 70 and the inflatable earplug 40 are not integrally formed. That is, the two seal pieces 70 are latched into the two slots 1011, respectively.

In other embodiments, the two seal pieces 70 and the housing 10 may be integrally formed.

Fourth Embodiment

Figure 6:
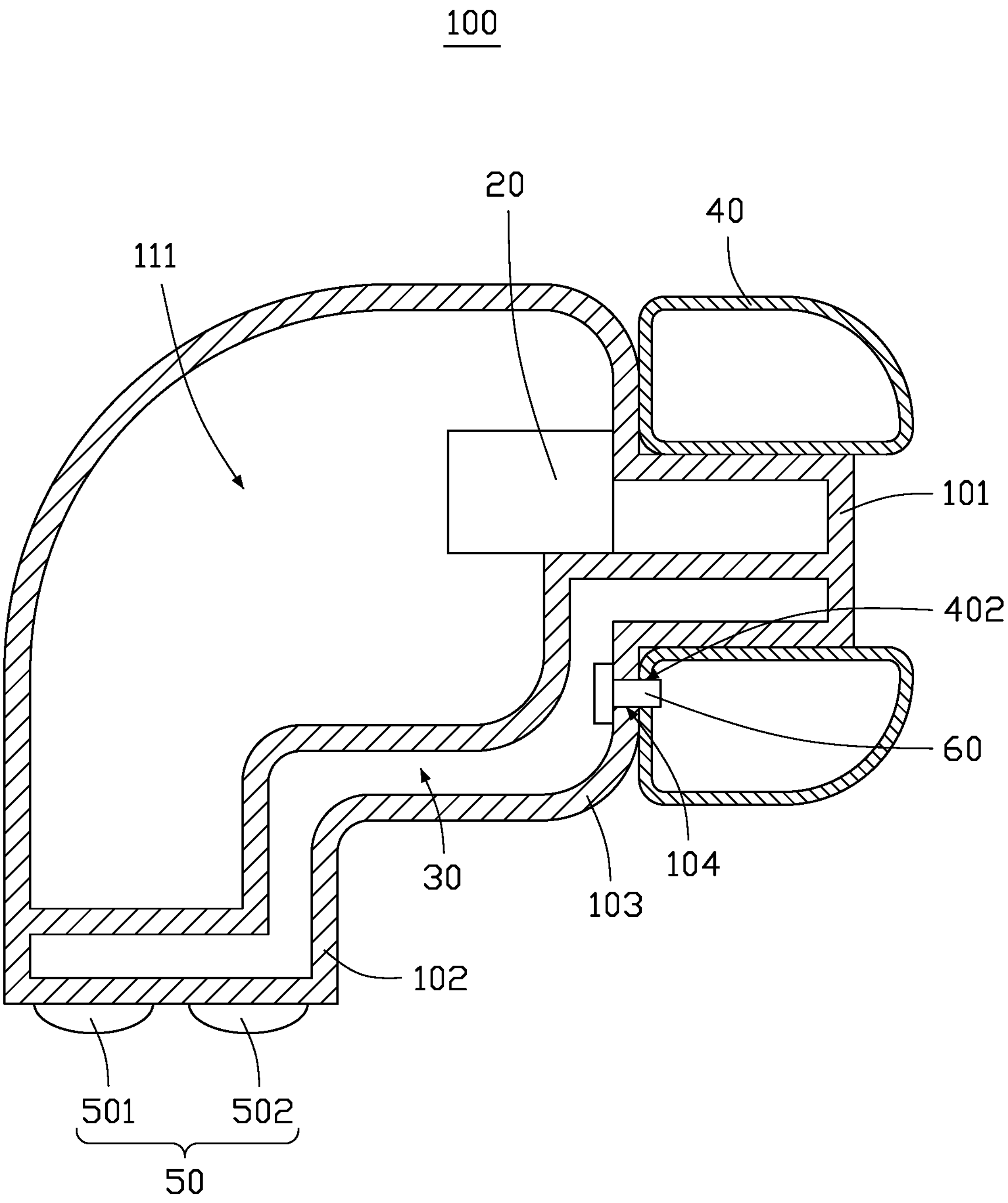
FIG. 6 is a schematic diagram of a fourth embodiment of an earphone according to the present disclosure.

Referring to FIG. 6, differences between the fourth embodiment and the third embodiment may include the first hole 104 being defined in the connecting portion 103.

Fifth Embodiment

Figure 7:
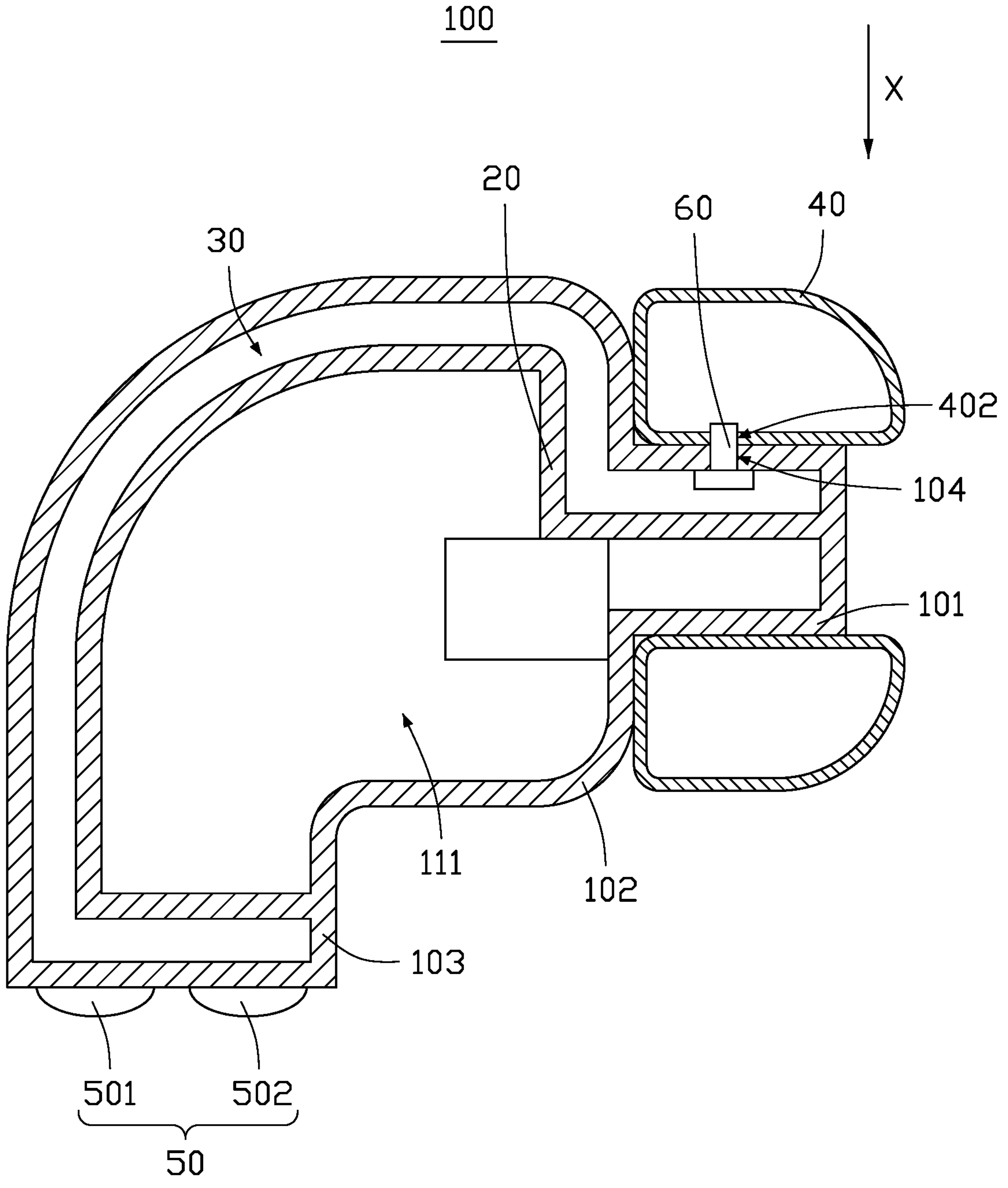
FIG. 7 is a schematic diagram of a fifth embodiment of an earphone according to the present disclosure.

Referring to FIG. 7, differences between the fifth embodiment and the fourth embodiment may include the air path 30 being above the sound path 111 in a length direction (that is an X-axis direction) of the earphone 100.

Sixth Embodiment

Figure 8:
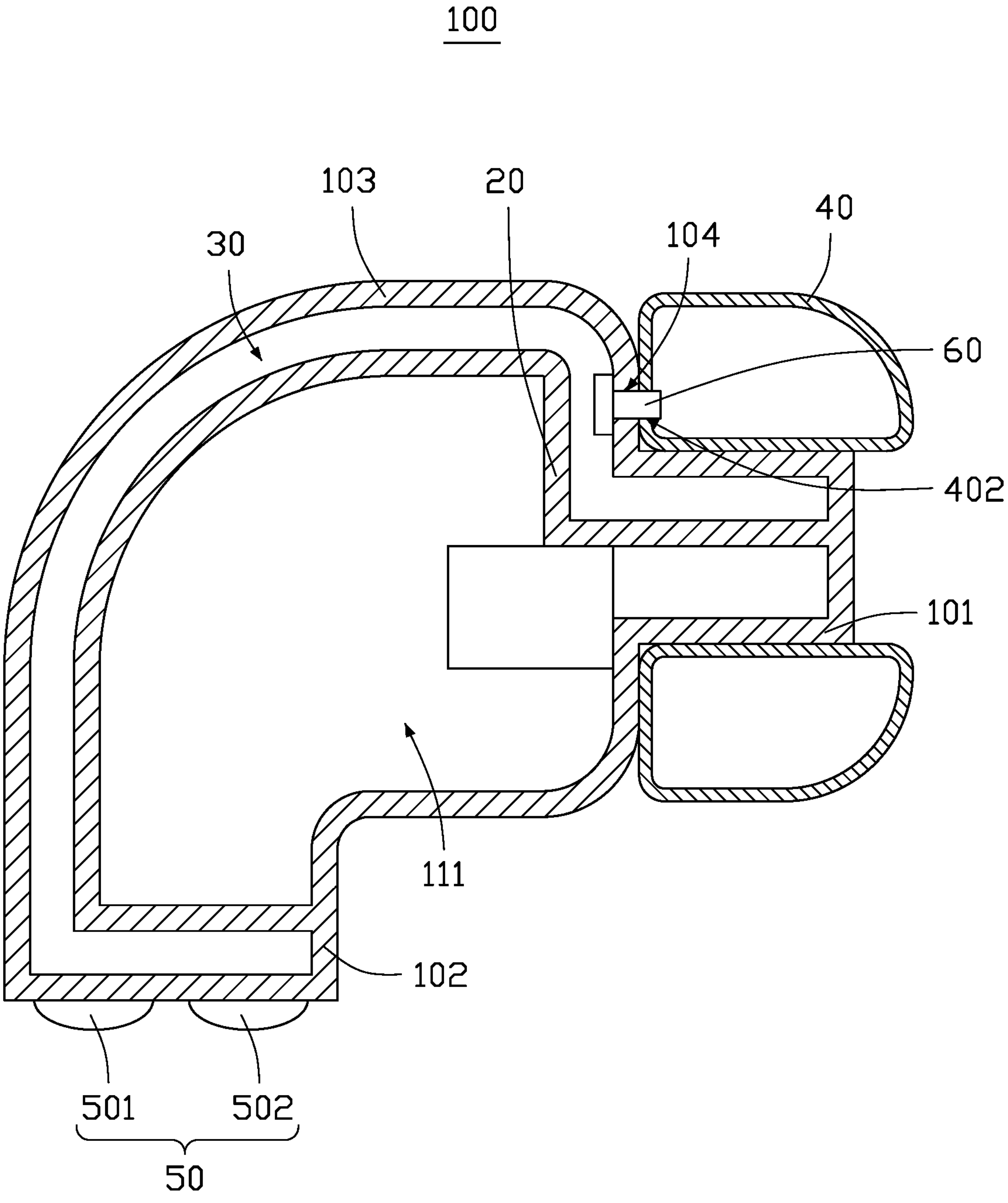
FIG. 8 is a schematic diagram of a sixth embodiment of an earphone according to the present disclosure.

Referring to FIG. 8, differences between the sixth embodiment and the fifth embodiment may include the first hole 104 being defined in the connecting portion 103.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An earphone comprising:

a housing;

a speaker arranged in the housing;

an air path, at least one part of the air path being defined in the housing;

an inflatable earplug communicating with the air path and detachably attached to the housing;

a control assembly arranged outside of the housing and configured to inflate and deflate the inflatable earplug through the air path;

an engaging piece, the engaging piece connected to a connection of the inflatable earplug and the air path; and two seal pieces, the two seal pieces arranged on opposite sides of the engaging piece.

2. The earphone of claim 1, wherein the housing defines a first hole communicating with the air path; the inflatable earplug defines a second hole engaging with the first hole; the engaging piece is arranging in the first hole and the second hole.

3. The earphone of claim 2, wherein the housing defines a receiving chamber, the receiving chamber comprises a dividing portion, the dividing portion divides the receiving chamber into a sound path and the air path, the speaker is arranged in the sound path.

4. The earphone of claim 3, wherein in a length direction of the earphone, the sound path is above the air path, or the air path is above the sound path.

5. The earphone of claim 3, wherein the housing comprises a front end portion and a rear end portion away from the front end portion, the inflatable earplug is arranged on the front end portion, the sound path and the air path extend from the rear end portion to the front end portion.

6. The earphone of claim 5, wherein the inflatable earplug is hollow ring shaped and defines an opening, the inflatable earplug is arranged on the front end portion through the opening, the front end portion is inserted into the opening, a part of the air path and a part of the sound path are positioned in the opening.

7. The earphone of claim 6, wherein the front end portion defines a plurality of sound holes communicating with each of the sound path and the opening, the sound holes are configured to transmit sound generated by the speaker.

8. The earphone of claim 5, wherein each of the seal piece is a seal ring, the two seal pieces and the inflatable earplug are integrally formed.

9. The earphone of claim 5, wherein each of the seal piece is a seal ring, the two seal pieces and the housing are integrally formed.

10. The earphone of claim 5, wherein the front end portion defines at least one slot engaging with the seal pieces, the at least one slot is arranged on at least one side of the engaging piece, the seal pieces are latched into the at least one slot.

11. The earphone of claim 5, wherein the front end portion defines two slots engaging with the two seal pieces, the two slots are arranged on opposite sides of the engaging piece, the two seal pieces are latched into the two slots, respectively.

12. The earphone of claim 5, further comprising a connecting portion, wherein the connecting portion is connected between the front end portion and the rear end portion.

13. The earphone of claim 12, wherein the first hole is defined in the connecting portion.

14. The earphone of claim 1, wherein the engaging piece comprises a valve.

15. The earphone of claim 1, wherein the control assembly comprises a pumping element, the pumping element is connected to the air path, the pumping element and the engaging piece cooperatively inflate the inflatable earplug with air through the air path.

16. The earphone of claim 1, wherein a material of the air path is same as or different from a material of the housing.

17. The earphone of claim 1, wherein the control assembly comprises a releasing valve connected to the air path, the releasing valve and the engaging piece cooperatively deflate the inflatable earplug through the air path.

* * * * *